US008793426B2

(12) United States Patent
Lundstrum et al.

(10) Patent No.: US 8,793,426 B2
(45) Date of Patent: *Jul. 29, 2014

(54) MICROCONTROLLER WITH LINEAR MEMORY ACCESS IN A BANKED MEMORY

(75) Inventors: Zeke R. Lundstrum, Chandler, AZ (US); Vivien Delport, Chandler, AZ (US); Sean Steedman, Phoenix, AZ (US); Joseph Julicher, Maricopa, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/701,664

(22) Filed: Feb. 8, 2010

(65) Prior Publication Data

US 2010/0205345 A1 Aug. 12, 2010

Related U.S. Application Data

(60) Provisional application No. 61/151,754, filed on Feb. 11, 2009.

(51) Int. Cl.
*G06F 12/00* (2006.01)
(52) U.S. Cl.
USPC ......... 711/5; 711/103; 711/211; 711/E12.001
(58) Field of Classification Search
None
See application file for complete search history.

(56) References Cited

U.S. PATENT DOCUMENTS

| 4,727,510 | A | * | 2/1988 | Scheuneman et al. ............ 711/5 |
| 4,833,640 | A | | 5/1989 | Baba ............................ 364/900 |
| 5,317,706 | A | * | 5/1994 | Pechter .......................... 711/2 |
| 5,455,937 | A | * | 10/1995 | Berman et al. ................. 703/23 |

(Continued)

FOREIGN PATENT DOCUMENTS

| EP | 0918273 A2 | 5/1999 | ............... G06F 9/35 |
| WO | 93/10501 | 5/1993 | ............. G06F 15/20 |
| WO | 2005/043383 A1 | 5/2005 | ............... G06F 9/30 |

OTHER PUBLICATIONS

Saghir, Mazen A. R. "Application-Specific Instruction-Set Architectures for Embedded DSP Applications." Graduate Department of Electrical and Computer Engineering, University of Toronto, 1998.*

(Continued)

*Primary Examiner* — Matthew Bradley
*Assistant Examiner* — Daniel Bernard
(74) *Attorney, Agent, or Firm* — King & Spalding L.L.P.

(57) ABSTRACT

A microcontroller has a data memory divided into a plurality of memory banks, an address multiplexer for providing an address to the data memory, an instruction register providing a first partial address to a first input of the address multiplexer, a bank select register which is not mapped to the data memory for providing a second partial address to a the first input of the address multiplexer, and a plurality of special function registers mapped to the data memory, wherein the plurality of special function registers comprises an indirect access register coupled with a second input of the address multiplexer, and wherein the data memory comprises more than one memory bank of the plurality of memory banks that form a block of linear data memory to which no special function registers are mapped.

22 Claims, 6 Drawing Sheets

(56) References Cited

U.S. PATENT DOCUMENTS

| | | | | |
|---|---|---|---|---|
| 5,530,934 | A | * | 6/1996 | Hilton .............................. 711/5 |
| 5,579,277 | A | * | 11/1996 | Kelly ...................... 365/230.02 |
| 5,872,987 | A | * | 2/1999 | Wade et al. ....................... 712/3 |
| 6,009,019 | A | * | 12/1999 | Fang ....................... 365/189.02 |
| 6,029,241 | A | * | 2/2000 | Wojewoda et al. ............ 712/38 |
| 6,694,319 | B1 | * | 2/2004 | Schmidt .................... 707/999.2 |
| 6,795,911 | B1 | | 9/2004 | Miyano ........................ 712/225 |
| 7,359,252 | B2 | * | 4/2008 | Suh ......................... 365/189.02 |
| 7,882,332 | B1 | * | 2/2011 | Chen et al. ................... 711/220 |
| 2002/0026545 | A1 | * | 2/2002 | Yoshida et al. ................ 710/56 |
| 2003/0058724 | A1 | * | 3/2003 | Wilson ......................... 365/222 |
| 2005/0207257 | A1 | * | 9/2005 | Skidmore ............... 365/230.01 |

OTHER PUBLICATIONS

International PCT Search Report and Written Opinion, PCT/US2010/023706, 16 pages, Mailed Oct. 8, 2010.

Wilhurst, Tim; "Designing Embedded Systems with PIC Microcontrollers: Principles and Applications", XP040426011, Referex Ord; 548 pages, Oct. 24, 2006.

International Preliminary Report on Patentability, PCT/US2010/023701, 10 pages, Aug. 16, 2011.

Chinese Office Action, Application No. 201080004730.9, 7 pages, Aug. 2, 2013.

Chinese Office Action, Application No. 201080004731.3, 11 pages, Aug. 20, 2013.

Chinese Office Action, Application No. 201080004730.9, 9 pages Apr. 1, 2014.

* cited by examiner

Data Memory

|  | 000 | 001 | 010 | 011 | 100 | 101 | 110 | 111 |
|---|---|---|---|---|---|---|---|---|
| 00h | INDF | INDF | INDF | INDF | INDF | INDF | INDF | INDF |
| | TMR0 | EECON | TMR0 | EECON | TMR0 | EECON | TMR0 | EECON |
| | PCL | PCL | PCL | PCL | PCL | PCL | PCL | PCL |
| | STATUS | STATUS | STATUS | STATUS | STATUS | STATUS | STATUS | STATUS |
| | FSR | FSR | FSR | FSR | FSR | FSR | FSR | FSR |
| | OSCCAL | EEDATA | OSCCAL | EEDATA | OSCCAL | EEDATA | OSCCAL | EEDATA |
| 06h | PORTB | EEADR | PORTB | EEADR | PORTB | EEADR | PORTB | EEADR |
| 07h | General Purpose Registers | ⇐ Addresses map back to addresses in Bank 0 | | | | | | |
| 0Fh | | | | | | | | |
| 10h | General Purpose Registers | General Purpose Registers | General Purpose Registers | General Purpose Registers | General Purpose Registers | General Purpose Registers | General Purpose Registers | General Purpose Registers |
| 1Fh | | | | | | | | |

*Figure 4*

MICROCONTROLLER WITH LINEAR MEMORY ACCESS IN A BANKED MEMORY

CROSS-REFERENCE TO RELATED APPLICATIONS

This application claims the benefit of U.S. Provisional Application No. 61/151,754 filed on Feb. 11, 2009, entitled "LINEAR MEMORY IN A BANKED RISC MICROCONTROLLER, AND RISC MCU WITH BANKED MEMORY AND SPECIALIZED BANKING INSTRUCTIONS", which is incorporated herein in its entirety.

TECHNICAL FIELD

The present disclosure relates to integrated microcontrollers, and, more particularly to memory access of the microcontroller.

BACKGROUND

A linearly accessible data memory space requires that a large number of memory bytes, for example, random access memory (RAM) bytes, be placed contiguously and addressable in an address space. The linear memory can then be fully addressed through an address whose length depends on the size of the RAM. Microcontrollers having long instructions such as 32-bit microcontrollers or microcontrollers with multiple instruction words can easily embed such a long address within the op-code of an instruction. However, smaller architectures, for example, 8-bit architectures with efficient limited instruction length often use an instruction size of for example 10-15 bits that does not allow for storing long addresses. Even though multiple word instructions could accommodate longer addresses, this counters compact coding and therefore, such processor architectures may not be able to address a large linear address space directly. Hence, memory banking is an efficient means to provide full access to a larger memory. In memory banking, only a limited amount, i.e. a single memory bank, is made available by means of a pointer. An instruction can then contain enough bits to access all memory locations within the selected memory bank. To switch to memory locations outside a selected bank, the pointer needs to be modified.

For example, many RISC architecture microcontrollers can only access a limited amount of bytes, for example, 32 or 64 bytes of memory directly through their instructions. By using multiple banks of 32 or 64 bytes, additional memory may be accessed. Microcontrollers are generally a combination of a microprocessor or central processing unit (CPU) with peripherals and memory on a single chip. Thus, microcontrollers which use the memory banking concept further face the problem that many special function registers used, for example, for control of these peripherals and internal functions, need to be accessed by the instruction set. Thus, these special function registers are made available by mapping them into the data memory. Because access to some special function registers is critical while executing a program, in many microcontrollers some of these special function registers need to be available all the time. For example, if special function registers are only accessible through the memory, the special function register used for selecting a memory bank needs to be accessible all the time or otherwise, a user would be stuck in a memory bank that does not make this register available. To accommodate this, in many microcontrollers, data memory mapping places a minimum number of such Special Function Registers (SFR) in each bank of the memory. However, this renders the data memory non-contiguous because the non-mapped memory blocks are separated by the memory-mapped registers.

SUMMARY

Hence, a microcontroller with a banked memory is needed, that also provides for a linear memory space that is larger than a memory bank.

According to an embodiment, a microcontroller may comprise a data memory divided into a plurality of memory banks, an address multiplexer for providing an address to the data memory, an instruction register providing a first partial address to a first input of the address multiplexer, a bank select register which is not mapped to the data memory for providing a second partial address to a the first input of the address multiplexer, and a plurality of special function registers mapped to the data memory, wherein the plurality of special function registers comprises an indirect access register coupled with a second input of the address multiplexer, and wherein the data memory comprises more than one memory bank of the plurality of memory banks that form a block of linear data memory to which no special function registers are mapped.

According to a further embodiment, the data memory may comprise n memory banks and m memory banks form the block of linear data memory. According to a further embodiment, n=8 and m=4. According to a further embodiment, the special function registers can be memory mapped to the lower part of all memory banks with the exception of the m memory banks. According to a further embodiment, even and odd memory banks of all memory banks with the exception of the m memory banks each may contain a different set of memory mapped special function registers. According to a further embodiment, the special function registers may comprise a virtual register and wherein a read or write access to the virtual register causes an indirect data memory access using the indirect access register. According to a further embodiment, the special function registers may comprise registers for performing a programming of a flash memory. According to a further embodiment, the special function registers can be selected from the group consisting of: a program counter register, a status register, a timer register, a port register, an oscillator calibration register. According to a further embodiment, the microcontroller can be an 8-bit microcontroller using 12-bit instruction words.

According to yet another embodiment, a method for addressing a memory for a microcontroller, wherein the memory is divided into a plurality of memory banks, may comprise the steps of: —providing access to special function registers only via memory mapping, wherein an indirect addressing register is mapped to at least one memory bank; —providing a plurality of memory banks within the memory without register mapping thereby forming a linear memory block; —providing a non-memory mapped bank select register; wherein for direct addressing: —selecting a memory bank by the bank select register, and —addressing the selected memory bank by an address provided by an instruction register; and wherein for indirect addressing: —using an address provided by the memory-mapped indirect addressing register.

According to a further embodiment, the data memory may comprise n memory banks and m memory banks may form the linear memory block. According to a further embodiment, n=8 and m=4. According to a further embodiment, the method may further comprise the step of memory mapping the special function registers to the lower part of all memory banks with the exception of the m memory banks. According to a further embodiment, even and odd memory banks all memory banks with the exception of the m memory banks each may contain a different set of memory mapped special function registers. According to a further embodiment, indirect addressing can be performed by a read or write access to a virtual register. According to a further embodiment, the special function registers may comprise registers for performing a programming of a flash memory. According to a further embodiment, the special function registers can be selected from the group consisting of: a program counter register, a status register, a timer register, a port register, an oscillator calibration register. According to a further embodiment, the microcontroller can be an 8-bit microcontroller using 12-bit instruction words.

According to yet another embodiment, a microcontroller may comprise: —a data memory divided into a plurality of memory banks, wherein a plurality of memory banks within the memory are free of mapped special function registers thereby forming a linear memory block; —special function registers mapped to the data memory which can be accessed by the microcontroller only via the memory, wherein an indirect addressing register is mapped to at least one memory bank; —a non-memory mapped bank select register; wherein the microcontroller is operable for direct addressing: —to select a memory bank by the bank select register, and —to address the selected memory bank by an address provided by an instruction register; and for indirect addressing: —to use an address provided by the memory-mapped indirect addressing register.

According to a further embodiment, the data memory may comprise 8 memory banks and four memory banks form the linear memory block. According to a further embodiment, the special function registers can be memory-mapped to the lower part of all memory banks with the exception of the four memory banks. According to a further embodiment, even and odd memory banks of the all memory banks with the exception of the four memory banks each may contain a different set of memory mapped special function registers.

BRIEF DESCRIPTION OF THE DRAWINGS

FIG. 4 shows an exemplary mapping in which even and odd banks each contain a different set of special function registers;

DETAILED DESCRIPTION

According to the teachings of this disclosure, a non-memory mapped bank select register (BSR) is provided for selecting one of a plurality of memory banks used for direct addressing. A memory mapped register is used for indirect addressing independent from the selected memory bank. The addition of a specialized banking instruction, for example, "Move Literal to BSR Register (MOVLB)" allows all of the data bytes in a bank of memory to be used for general purpose data and therefore allows contiguous addressing across a plurality of the memory banks that do not contain any mapped special function registers. Hence, the BSR register that selects the active memory bank is not mapped in the data register, but may be accessible with a specialized command.

Thus, a plurality of memory banks are available that do not have or require special registers therein. This allows adjacent banks of the memory to be indirectly addressed via an indirect addressing register (FSR) without concern or need for special function registers (SFR) in each memory bank. This allows addressing of larger blocks of memory, for example, for use as buffers, tables, scratch pad areas, etc. Any functions using a data structure larger than the banked memory size may be thus implemented.

Figure 1:
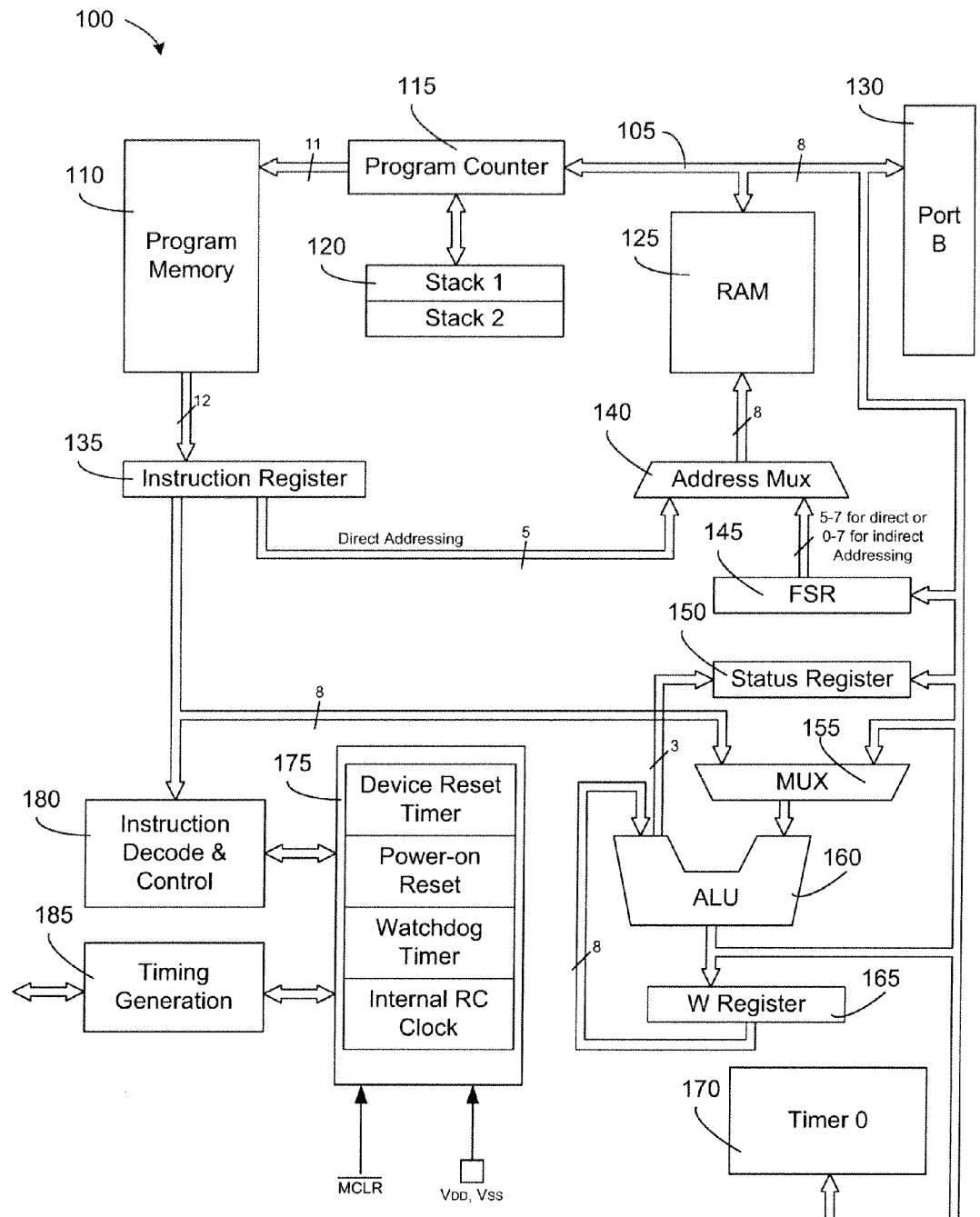
FIG. 1 shows a block diagram of a conventional microcontroller.

FIG. 1, shows a simplified block diagram of conventional microcontroller with a data memory that can be accessed with a banking mechanism. A program memory 110 stores a plurality of instructions forming an executable program. Program counter 115 may be designed to have for example 11 bits for addressing a 2 k linear program memory. A stack 120 may be provided to store program counter values when subroutines are executed. The shown exemplary microcontroller is an 8-bit Harvard-type microcontroller that operates with a 12-bit instruction words stored in program memory 110. Thus, a central 8-bit data bus 105 may be used to couple various functional elements within the microcontroller, such as for example timer unit 0 and external port B 130. The data memory 125 is coupled with this bus 105 and receives for example an 8-bit address from address multiplexer 140. For direct addressing, address multiplexer 140 combines an address from address data supplied by the instruction register 135 and address data supplied by special function register 145. In direct addressing mode, the instruction register 135, thus, supplies the lower 5 bits and the special function register 145 the upper 3 bits. Thus, according to an embodiment, special function register 145 operates as a bank select register capable of selecting one of 8 different memory banks. In indirect addressing, special function register 145 provides for a complete address with all bits 0-7. Indirect addressing is implemented by accessing special function register INDF which is a virtual register and therefore not a physical register. Any read or write access to this register INDF forces that an indirect access is applied to the data memory 125 via special function register 145. thus, instead of reading or writing register INDF, an indirect data memory access is performed.

According to various embodiments, instruction register 135 receives an instruction directly from program memory 110 and is coupled with an instruction decode & control unit 180, for example, through another internal 8 bit bus. Instruction decode & control unit 180 is furthermore coupled with certain internal function provided by unit 175. For example, this functional unit 175 may include a device reset timer, a power-on reset, a watchdog timer, an internal RC clock, etc. Other functions can be integrated and/or certain functions may be omitted. Timing generation unit 185 may provide for internal timing signals and can also be coupled with unit 175. The conventional 8-bit microcontroller core shown in FIG. 1 has an arithmetic logic unit 160 (ALU) coupled with a status register 150. The ALU 160 is further coupled with a working register 165 and receives data from the instruction register 135 and the 8-bit data bus through multiplexer 155 on one hand and on the other hand from working register 165. FIG. 1, thus, merely shows some essential structures of a microcontroller core. Other internal structures are possible and can be combined with the specific embodiments shown in FIG. 2 as will be explained in more detail below.

Figure 2:
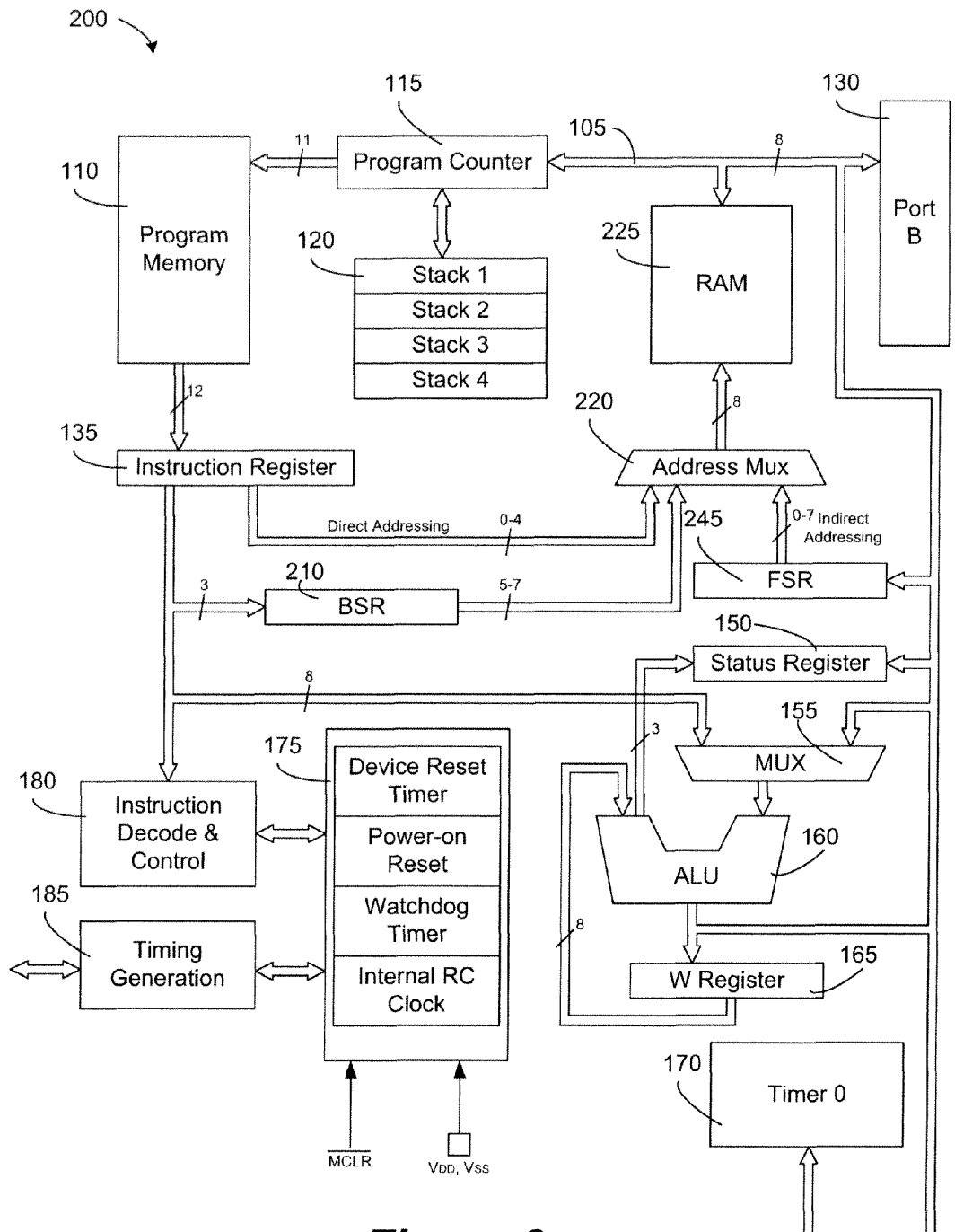
FIG. 2 shows a block diagram of an exemplary microcontroller according to an embodiment.
Figure 3:
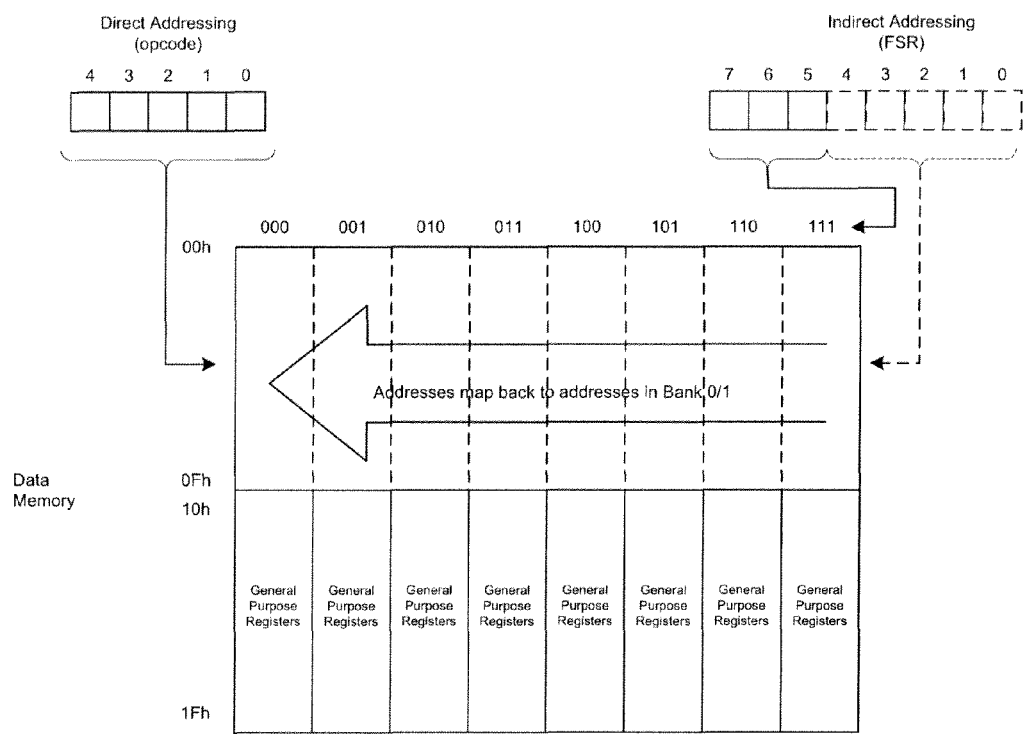
FIG. 3 is a block diagram showing a conventional banked memory.

FIG. 3 shows the structure and mapping of data memory 125 in a conventional microcontroller. As mentioned above, because at least some special function register must be available all the time, the first 16 data bytes in address 00h-0Fh of all memory banks contain the values of 16 special function registers. These special function registers may be physically detached from the memory. However, a mapping architecture maps these 16 special function registers to all memory banks. In the embodiment shown in FIG. 2, every memory bank contains the same special function registers in addresses 00h-0Fh. However, as some special function registers are less critical, they may be accessed only in every other bank. Thus, more than 16 special function registers can be mapped into the first 16 addresses. For example, all even banks and all odd banks have the same mapping structure, respectively.

FIG. 4 shows an exemplary mapping in which even and odd banks each contain a different set of special function registers. For example, all even banks may have the following special function registers mapped to addresses 00h-06h:

INDF—if accessed, FSR is used to address data memory indirectly.
TMR0—Timer 0 module register
PCL—stores the low order bits of the program counter
STATUS—contains typical status bits of the CPU
FSR—bank select register, contains 3 bits to select one of eight memory pages
OSCCAL—oscillator calibration register
PORTS—Port B register The following registers can be mapped to addresses 00h-06h of all odd memory banks:
00h—INDF—if accessed, FSR is used to address data memory indirectly.
01h—EECON—configuration bits for flash memory
02h—PCL—stores the low order bits of the program counter
03h—STATUS—contains typical status bits of the CPU
04h—FSR—bank select register, contains 3 bits to select a memory page
05h—EEDATA—self write data register for flash memory
06h—EEADR—self write address for flash memory The remaining addresses 07h-0Fh are all the same for even and odd memory banks. As shown in FIG. 3, the upper addresses 10h-1Fh of each bank comprise individual general purpose registers. However, they form individual small memory blocks and do not form one linear block of memory. Thus, if, for example, a table is larger than the maximum size of general purpose registers in one bank, the table must be distributed to more than one bank and cumbersome programming is necessary to access such a table.

FIG. 2 shows an exemplary embodiment of a microcontroller that overcomes such a limitation. Generally, similar elements carry the same reference symbol. The data memory RAM 225 shown in FIG. 2 can be identical to the memory as shown in FIG. 1. However, a different reference symbol is used to indicate that this RAM 225 is differently mapped as will be explained below in more detail. This data memory now comprises a linear memory block consisting of a plurality of sequential memory banks to which no special function registers are mapped. An additional bank select register (BSR) 210 is provided wherein this register is accessible through a dedicated instruction and therefore not memory mapped. The content of this register 210 provides for the upper 3 bits of an address provided by address multiplexer 220 which receives the lower 5 bits from instruction register 135. The special function register FSR 145 may now be an 8-bit register which can be used for indirect addressing of the entire linear data memory independent of the currently selected memory bank. In other embodiments, this register can be limited to access the upper 4 banks that form the linear data memory by setting bit 7 permanently to "1". However, this register does not provide for the bank select function per se anymore. Bank selection is effected only by writing a respective bank number into the non-memory mapped bank select register 210. Thus, even when a memory bank within the linear memory block is selected, the dedicated instruction allows for change to any other memory bank.

Figure 5:
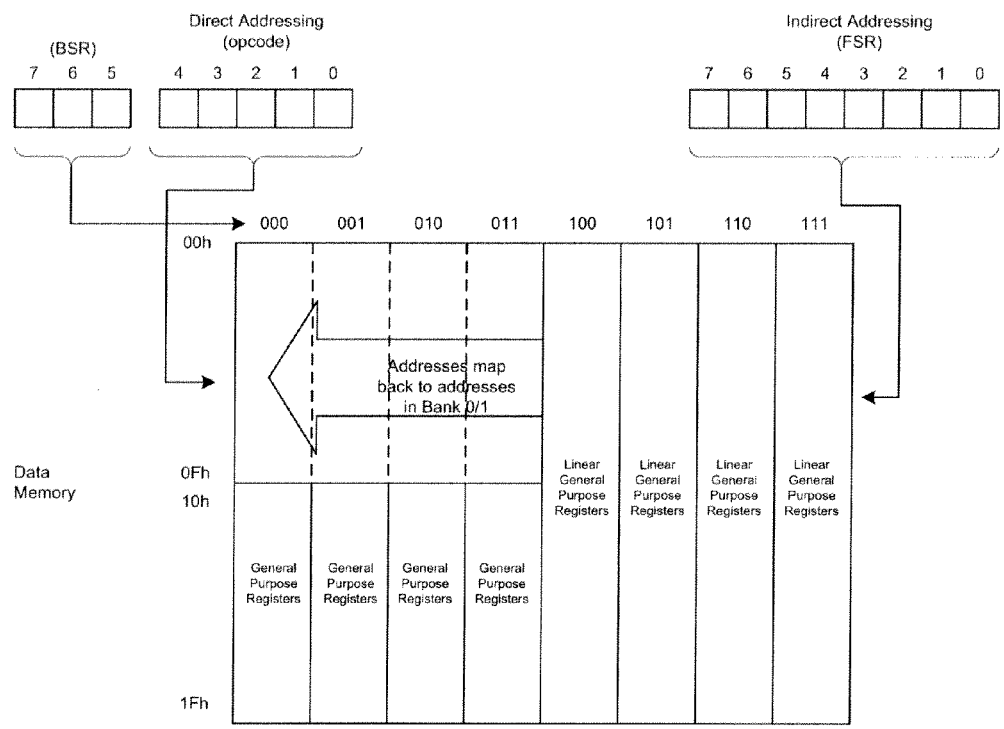
FIG. 5 shows a memory mapping according to an embodiment.

FIG. 5 shows an embodiment of how the special function registers may be mapped to the data memory 225. In this embodiment, only the lower four banks are used to provide access to the special function registers whereas the upper four banks now provide for a linear contiguous data memory space. FIG. 4 also shows how direct and indirect addressing is performed. Here, non-memory mapped register BSR 210 provides for the banks select information, thereby providing the address multiplexer 220 with the upper three address bits. The instruction register provides for the lower 5 address bits. Multiplexer 220 combines these two address data portions to form a 8-bit address used to address data memory 225. More or less bits may be used to form an address in other embodiments. If bank select register 210 selects one of the lower four memory banks, then all addresses 00h-0Fh may be mapped back to bank 0 or alternately to bank 0 or bank 1 as will be explained in more detail in FIG. 6. As mentioned above, the upper four memory banks have no special function registers mapped to them and thus form a contiguous linear data memory. This linear memory block may still be accessed through direct addressing using bank select register 210 and the address information provided in the instruction op-code. However, direct addressing is limited to be performed only within the currently selected bank. Thus, the linear memory block can alternatively be accessed indirectly through special function register FSR 245 which can now store an 8-bit address capable of fully addressing the data memory 225 independent from the selected memory bank. Hence, for example a table, scratch pad, or buffer with, for example 128 entries can be simply accessed through indirect addressing. Access to the entire data memory by means of this special function register 245 can be performed through a special instruction or if no such instruction is implemented through read or write access to a special function register INDF as explained above.

Due to the fact that bank select register 210 is not memory mapped, as mentioned above a special op-code is reserved to perform read and write function with respect to this register. One or more dedicated instructions provide access directly to the non-memory mapped bank select register 210. For example, a single instruction "Move Literal to BSR Register" (MOVLB) may be used to transfer data into bank select register 210. The usable bits of bank select register 210 depend on the number of memory banks into which the data memory is divided. In the example shown in FIGS. 5 and 6, the data memory is divided into eight memory banks, each bank having 32 bytes. Thus, this embodiment provides for 256 data memory bytes wherein the upper four banks provide for 128 bytes forming a linear memory block that is not interrupted by mapped special function registers.

The instruction MOVLB when decoded provides for direct access to the bank select register and, for example, writes a literal directly into register 210 wherein for example, only the lower 3 bits of the literal are transferred. Other coding may be used and more than one instruction may be available to read and/or write to the bank select register 210. In other implementations more memory banks may be provided and bank select register 210 may have more than 3 bits to be able to address all banks. Other additional dedicated instructions can be provided for. Other additional dedicated instructions can be provided for. For example, a read instruction, or any type of arithmetic or logical modification instructions, such as, increment and, decrement, masking, or Boolean function may be provided for. To this end, an additional coupling of the special function register 210 with ALU 160 may be provided as indicated by the dotted line in FIG. 2.

Figure 6:
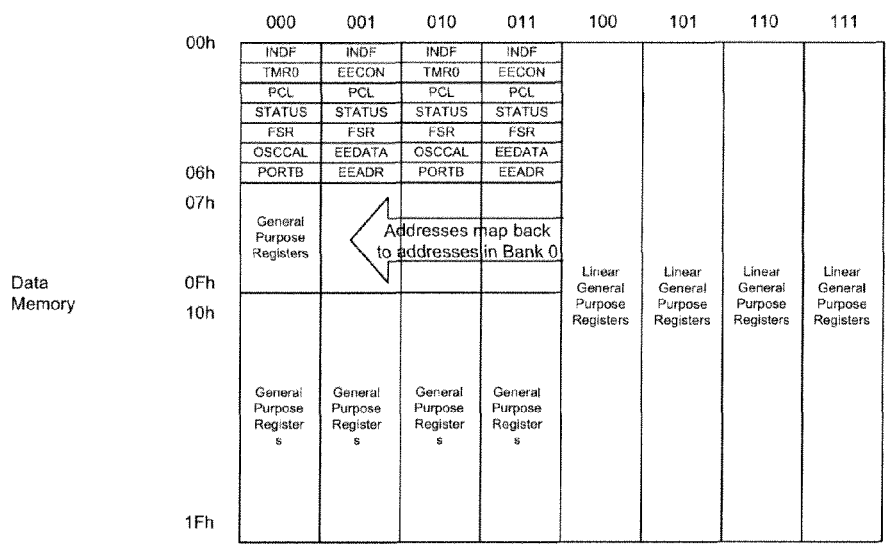
FIG. 6 shows an exemplary mapping for a 256 byte data memory according to an embodiment.

FIG. 6 shows an exemplary mapping for a 256 byte data memory in which banks 0 and 2 each contain a different set of special function registers than banks 1 and 3. For example, the following special function registers can be mapped to addresses 00h-06h of banks 0 and 2:

00h—INDF—if accessed, FSR is used to address data memory indirectly.
01h—TMR0—Timer 0 module register
02h—PCL—stores the low order bits of the program counter
03h—STATUS—contains typical status bits of the CPU
04h—FSR—bank select register, contains 3 bits to select a memory page
05h—OSCCAL—oscillator calibration register
06h—PORTB—Port B register The following registers can be mapped to addresses 00h-06h of banks 1 and 3:

00h—INDF—if accessed, FSR is used to address data memory indirectly.
01h—EECON—configuration bits for flash memory
02h—PCL—stores the low order bits of the program counter
03h—STATUS—contains typical status bits of the CPU
04h—FSR—bank select register, contains 3 bits to select a memory page
05h—EEDATA—self write data register for flash memory
06h—EEADR—self write address for flash memory The selection of which special function register is mapped to the lower four banks depends on the specific implementation and may vary. Also, the number of memory banks can be smaller or larger as well as the number of banks used to form the linear memory block.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A microcontroller comprising:
a data memory divided into a plurality of memory banks;
an address multiplexer for providing an address to said data memory, wherein the address multiplexer is configured to only select between a first input and a second input;
an instruction register providing a first partial address to the first input of said address multiplexer;
a bank select register which is not mapped to said data memory for providing a second partial address to said first input of said address multiplexer; and
a plurality of special function registers mapped to more than one bank of said data memory, wherein said plurality of special function registers comprises an indirect access register coupled with the second input of said address multiplexer, and wherein said data memory comprises more than one memory bank of said plurality of memory banks that form a block of linear data memory to which no special function registers are mapped.

2. The microcontroller according to claim 1, wherein said special function registers comprise a virtual register and wherein a read or write access to said virtual register causes an indirect data memory access using said indirect access register.

3. The microcontroller according to claim 1, wherein the special function registers comprise registers for performing a programming of a flash memory.

4. The microcontroller according to claim 1, wherein the special function registers are selected from the group consisting of: a program counter register, a status register, a timer register, a port register, an oscillator calibration register.

5. The microcontroller according to claim 1, wherein the microcontroller is an 8-bit microcontroller using 12-bit instruction words.

6. The microcontroller according to claim 1, wherein said data memory comprises n memory banks and m of said n memory banks form said block of linear data memory.

7. The microcontroller according to claim 6, wherein n=8 and m=4.

8. The microcontroller according to claim 7, wherein the special function registers are memory mapped to the lower part of all memory banks with the exception of the m memory banks.

9. The microcontroller according to claim 8, wherein even and odd memory banks of all memory banks with the exception of the m memory banks each contain a different set of memory mapped special function registers.

10. A method for addressing a memory for a microcontroller, wherein the memory is divided into a plurality of memory banks, the method comprising the steps of:
providing access to a plurality of special function registers only via memory mapping, wherein an indirect addressing register is mapped to more than one memory bank;
providing a plurality of memory banks within said memory without register mapping thereby forming a linear memory block;
providing a non-memory mapped bank select register;
providing an address to said memory only by selecting either a first address for direct addressing or a second address for indirect addressing;
wherein for direct addressing, said first address is formed by:
selecting a memory bank by said bank select register, and addressing said selected memory bank by an address provided by an instruction register;
and wherein for indirect addressing, said second address is formed by:
using an address provided by said memory-mapped indirect addressing register.

11. The method according to claim 10, wherein indirect addressing is performed by a read or write access to a virtual register.

12. The method according to claim 10, wherein the special function registers comprise registers for performing a programming of a flash memory.

13. The method according to claim 10, wherein the special function registers are selected from the group consisting of: a program counter register, a status register, a timer register, a port register, an oscillator calibration register.

14. The method according to claim 10, wherein the microcontroller is an 8-bit microcontroller using 12-bit instruction words.

15. The method according to claim 10, wherein said data memory comprises n memory banks and m of said memory banks form said linear memory block.

16. The method according to claim 15, wherein n=8 and m=4.

17. The method according to claim 15, comprising the step of memory mapping the special function registers to the lower part of all memory banks with the exception of the m memory banks.

18. The method according to claim 17, wherein even and odd memory banks all memory banks with the exception of the m memory banks each contain a different set of memory mapped special function registers.

19. A microcontroller comprising:
- a data memory divided into a plurality of memory banks, wherein a plurality of memory banks within said memory are free of mapped special function registers thereby forming a linear memory block;
- special function registers mapped to said data memory which can be accessed by said microcontroller only via said memory, wherein an indirect addressing register is mapped to more than one memory bank;
- a single non-memory mapped bank select register;
- wherein the microcontroller is configured to provide an address to said memory only by selecting either a first address for direct addressing or a second address for indirect addressing and wherein to provide said first address for direct addressing, the microcontroller:
- selects a memory bank by said bank select register, and
- addresses said selected memory bank by an address provided by an instruction register;
- and to provide said second address for indirect addressing, the microcontroller:
- uses an address provided by said memory-mapped indirect addressing register.

20. The microcontroller according to claim 19, wherein said data memory comprises eight memory banks, and four of said eight memory banks form said linear memory block.

21. The microcontroller according to claim 20, wherein the special function registers are memory-mapped to the lower part of all memory banks with the exception of said four memory banks.

22. The microcontroller according to claim 21, wherein even and odd memory banks of the all memory banks with the exception of said four memory banks each contain a different set of memory mapped special function registers.

* * * * *